Figure 1:
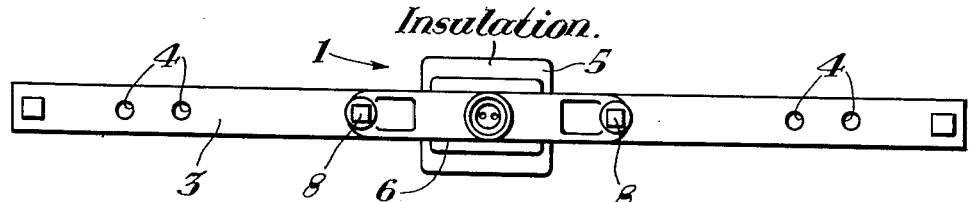

Dec. 18, 1951

L. R. ALLISON ET AL 2,579,288

VEHICLE CARRIED INDUCTIVE RECEIVER

Filed April 4, 1950

2 SHEETS—SHEET 1

INVENTORS
Leslie R. Allison and
BY Harold V. Rudolph.

THEIR ATTORNEY

Dec. 18, 1951  L. R. ALLISON ET AL  2,579,288
VEHICLE CARRIED INDUCTIVE RECEIVER
Filed April 4, 1950  2 SHEETS—SHEET 2
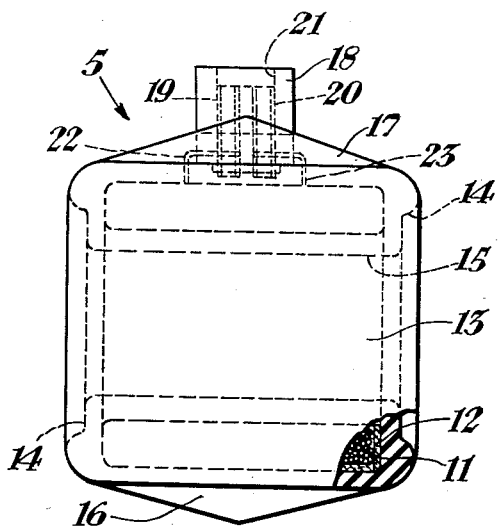
Fig. 4.
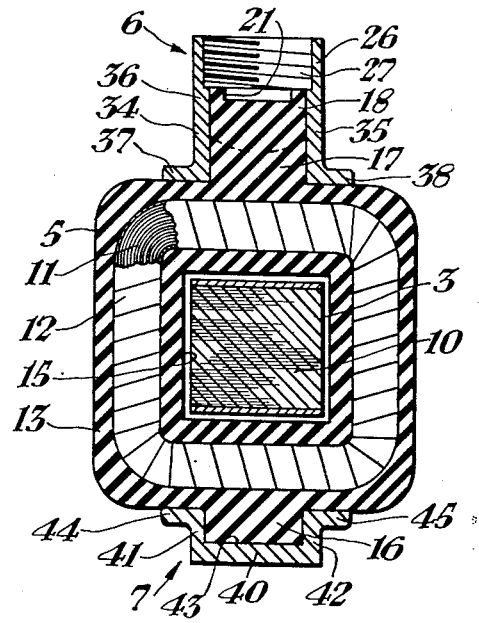
Fig. 5.
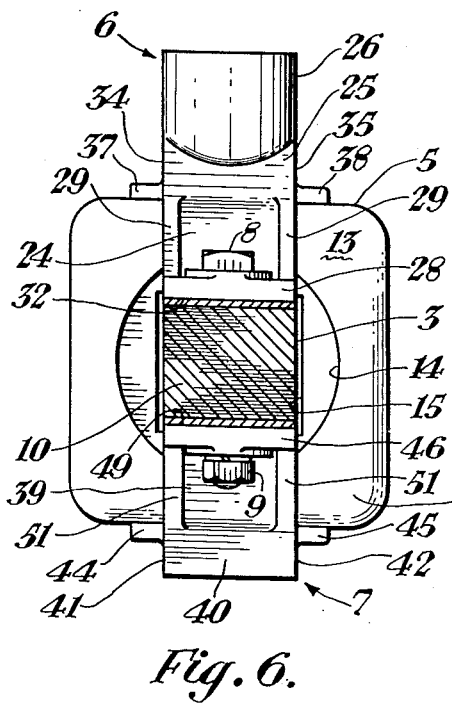
Fig. 6.
Fig. 7.
INVENTORS
Leslie R. Allison and
BY Harold V. Rudolph.
THEIR ATTORNEY

UNITED STATES PATENT OFFICE 2,579,288

VEHICLE CARRIED INDUCTIVE RECEIVER

Leslie R. Allison, Forest Hills, and Harold V. Rudolph, Wilkinsburg, Pa., assignors to Westinghouse Air Brake Company, a corporation of Pennsylvania Application April 4, 1950, Serial No. 153,964

6 Claims. (Cl. 175—21)

Our invention relates to inductive receivers, and more particularly to receivers carried by a locomotive or a vehicle for transferring electrical energy from the trackway to a governing or signaling device on the locomotive or vehicle.

Vehicle carried receivers used in railway train control apparatus have been proposed in the past in which the coil windings of the receivers were enclosed in a housing to protect the windings against the severe shocks, vibrations and impacts to which such windings are often subjected. The coil windings of such receivers required time consuming manufacturing methods in which the coil windings are covered with rubber tape and the tape then vulcanized to provide a waterproof seal. The coil winding leads were also wrapped their entire exposed length with rubber tape and the tape then vulcanized so that water, acid or dirt would not enter the coil along the leads. Due to the excessive vibration to which such track receivers are subjected in operation, the subsequent installation of the coil winding on the receiver core required wedging of the coil to the core to provide clearance between the coil and core so that relative motion between the parts and consequent wear of the coil structure would be reduced to a minimum. The installation of the coil also required rugged housing members for enclosing the coil and protecting the coil from being struck by foreign objects and since water and other matter could and did enter the coil enclosure, drain openings in the housing members were necessary to permit the escape of the trapped water. A hot pouring compound was also used to assist in anchoring the coil rigidly to the assembly; the compound being poured into the inverted housing members through the drain opening so that the upper half of the housing would be filled with the solidified compound.

Such receivers have proven expensive from a manufacturing and assembling standpoint, over fifty separate assembly parts being required to form a receiver of this character, and from a maintenance and replacement standpoint due in most part to the number of individual parts.

It is an object of our present invention to provide a vehicle carried inductive receiver which shall consist of few and simple parts, easily assembled and readily installed, and which shall be interchangeable with existing receivers now in use.

Another object of our invention is to provide a vehicle carried inductive receiver in which the coil winding is embedded in an enclosure of insulation material which will provide the necessary insulation resistance to water and moisture and which will protect the coil from damage by foreign objects.

According to our invention, a coil winding is molded into a substantially cube formed enclosure of tough, abrasion-resistant oil and waterproof insulation material, such as rubber, rubber compounds, etc. The enclosure is formed with a square through opening therein which is slightly larger in cross section than the magnetizable core which is received within the enclosure opening. Integral with the enclosure are two oppositely extending supporting ribs, one rib terminating in a plug receptacle to which the ends of the coil winding are connected.

The enclosure encasing the coil winding is fixed to the core by means of two clamps, each of the clamps being formed with appropriately shaped recesses for receiving the extending ribs of the enclosure to position the coil with respect to the core. The clamps are further characterized by the inclusion of supporting flanges which hold the coil assembly in place on the core. The enclosure is so fixed on the core by the two clamps that clearance is maintained between the core and the inner surfaces of the enclosure opening without the use of wedges or other means which heretofore were found necessary.

Other objects and characteristic features of our invention will become apparent as the description continues.

We shall describe one form of vehicle carried inductive receiver embodying our invention, and shall then point out the novel features thereof in claims.

Figure 2:
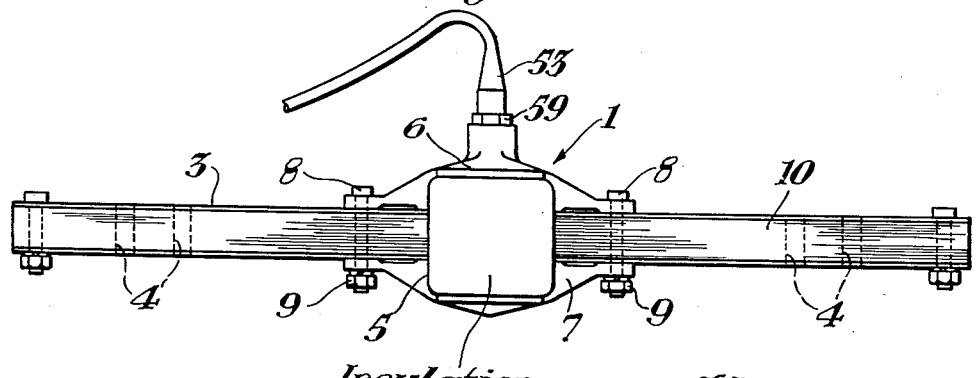
Figure 3:
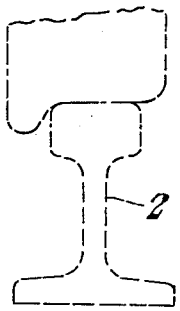
Figure 3:
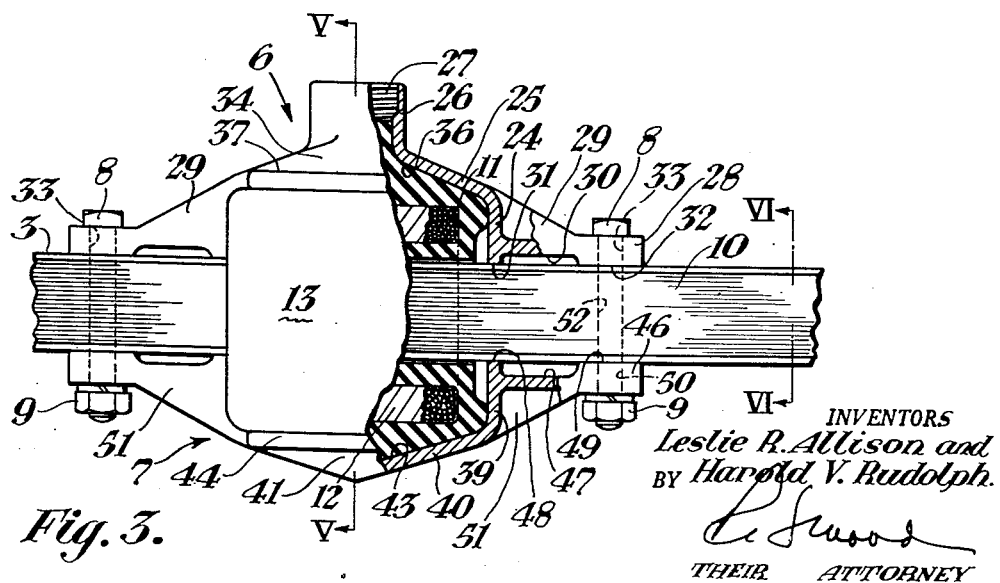

In the accompanying drawings, Fig. 1 is a top plan view of an inductive receiver embodying our invention. Fig. 2 is a front elevational view of a train carried inductive receiver illustrated in juxtaposition with a track rail. Fig. 3 is an enlarged front elevational view of our inductive receiver, portions of which have been broken away to show details of the clamp arrangement and coil winding. Fig. 4 is an elevational view of the receiver coil winding encased in its molded enclosure, portions of which are shown in cross section. Figs. 5 and 6 are sectional views taken along the lines V—V and VI—VI, respectively, of Fig. 3, while Fig. 7 is an elevational view of the plug connector for the receiver coil.

Similar reference characters refer to similar parts in each of the several views.

Referring to Figs. 1 and 2 of the drawings, the numeral 1 designates an inductive receiver embodying our invention adapted to be mounted on a locomotive or other railway vehicle in close proximity to a track rail 2. Normally two such receivers are carried by a vehicle, a receiver being provided for each track rail to transfer electrical energy from the trackway to a governing or signaling means on the vehicle. The receiver 1 comprises a laminated core 3 of high permeability low loss transformer steel, having a square cross section and adapted to be mounted to the underside of the railway vehicle and transversely of the trackway by suitable bolts (not shown) passing through the mounting holes 4. A coil structure 5 is held in place on the core at its midpoint by an upper clamp 6 and a lower clamp 7; the clamps 6 and 7 being fixed to the core 3 as by bolts 8 and nuts 9, the bolts 8 passing through suitable openings in the laminations 10 of the core 3.

The coil structure 5 (Figs. 4 and 5) comprises a coil winding 11 of general square configuration covered with insulating tape 12 and molded in an enclosure 13 of tough, abrasion-resistant oil and waterproof insulation material, such as rubber, rubber compounds, etc. The enclosure 13 is substantially cube shaped and provided with annular recesses 14 in the sides thereof terminating in a square through opening 15. The opening 15 receives the core 3 and it will be noted in Figs. 5 and 6 that the opening 15 is slightly larger in cross section than the core 3. The bottom face of the enclosure 13 is formed with an integral triangularly shaped rib 16 while the top face of the enclosure is formed with a similar integral rib 17 terminating in a cylindrical plug receptacle 18. The plug receptacle comprises two split metallic sockets 19 and 20 of different internal diameters embedded in the enclosure and terminating short of the top of the receptacle in an annular recess 21. The lower ends of the sockets 19 and 20 are fixed to the ends 22 and 23 of the coil winding. A small coil spring (not shown) encircles each split socket to insure proper engagement of the sockets and the prongs of the plug hereinafter described.

It will be appreciated from the foregoing description that the coil winding 11 embedded in the enclosure 13 forms an integral unit which may be readily assembled on its core structure. The coil structure 5 thus lends itself readily to initial assembling of the receiver and to disassembling for replacement purposes when in service. The enclosure effectively seals the coil winding 11 against the deleterious effects of moisture, oil and heat; all of which tend to deteriorate and alter the characteristics of the coil winding, and at the same time serves as a protective covering for the coil winding 11 which protects the winding from external shock, abrasive action and physical impact of foreign objects.

The upper coil clamp 6 (Figs. 3, 5 and 6) comprises a casting of general rectangular proportions made of a nonmagnetic material such as brass and having two vertical end walls 24 terminating at the upper ends in the inclined top walls 25. The top walls 25 of the clamp terminate at their upper edges in an annular receptacle 26 having internal threads 27 cut therein at the top edge thereof. The vertical end walls 24 terminate at the bottom edges in two oppositely extending end flanges 28, the vertical end walls and the flanges being interconnected by reinforcing webs 29 forming a continuation of the inclined top walls 25. The flanges 28 are formed with recesses 30 in the bottom surfaces thereof to form pads 31 for the bottom of the end walls 24 and pads 32 at the outer ends of the flanges; the pads 32 being drilled as at 33 to form mounting holes for the clamp.

The clamp 6 further comprises front and back walls 34 and 35 integral with the inclined top walls 25 and forming therewith a substantially triangularly shaped recess 36 within the clamp 6. Both the front and back walls 34 and 35 terminate in oppositely extending flanges 37 and 38, respectively.

The lower coil clamp 7 is similar to the upper clamp 6 and comprises two vertical end walls 39 terminating at the lower edges in the inclined bottom walls 40 and having triangularly shaped front and back walls 41, 42 to form an upended triangular recess 43. The triangularly shaped front and back walls terminate in oppositely extending flanges 44 and 45, respectively, while the vertical end walls terminate in oppositely extending flanges 46 at right angles to the flanges 44, 45. The end flanges 46 are formed with recesses 47 in the top surfaces thereof to form pads 48 and 49, the pads 49 being provided with mounting holes 50. Webs 51 interconnect the end flanges 46 and the vertical end walls 39, forming a continuation of the inclined bottom walls 40.

In assembling the unit, the coil structure 5 is slipped over the core 3 and temporarily positioned near the mid-point of the core. The upper and lower coil clamps 6 and 7 are placed and held in position on the coil structure 5 with the triangularly shaped rib 17 and plug receptacle 18 on the top of the enclosure 13 being received within the recess 36 and annular receptacle 26 of the upper clamp, and the triangularly shaped rib 16 on the bottom of the enclosure being received within the recess 43 of the lower clamp. The bolts 8 are then inserted through the openings 33 and 50 of the end flanges 28 and 46 and suitable mounting holes 52 in the core 3 and the clamps 6 and 7 fastened to the core as by the nuts 9.

It will be noted that the square opening 15 of the enclosure 13 is larger in cross section than the laminated core 3. In former inductive receivers of this type it was necessary to provide insulating wedges to maintain the coil in position on the core with the inner surfaces of the coil assembly spaced a prescribed distance from the core to prevent relative motion of the coil assembly due to the vibration of the parts caused by the pounding of the vehicle on the track rails. The molded coil structure 5 and the clamps 6 and 7 of the present receiver serve two functions i. e., the coil structure is held in position on the core and the inner surface of the enclosure opening is spaced a prescribed distance from the core. This has been made possible by the provision of the triangularly shaped ribs 16 and 17 on the enclosure 13 and by the initial size of the opening in the coil winding 11 and the subsequent dimensioning in the molding of the square opening 15 in the enclosure. The triangularly shaped ribs 17 and 16 are received within the appropriately shaped recesses 36 and 43 in the respective clamps 6 and 7 and are positioned thereby on the core structure, the extending flanges 37, 38 and 44, 45 acting as supports and clamping means for the coil structure. The clamps 6 and 8 being rigidly fixed to the core will hold the coil structure in position with the inner surfaces of the square opening 15 spaced from the laminated core.

A plug connector 53 (Fig. 7) is provided for connecting the coil winding 11 to the vehicle carried governing means. The plug connector is of molded rubber, rubber compounds, etc., the cable portion 54 terminating in a generally conical shaped section 55 and a washer 56. Two prongs 57 and 58 of different diameters are molded into the conical section of the connector for insertion into the sockets 19 and 20, respectively, of the coil structure. A nut 59 is provided for fastening the plug connector to the annular opening 26 of the clamp 6. After the prongs 57, 58 are inserted in the sockets 19, 20, the nut 59 is screwed into the annular opening 26, the tightening of the nut 59 tending to compress the plug end within the annular opening 26 to form a watertight seal therewith.

We have thus provided an improved track receiver which is readily interchangeable with existing track receivers now in use, and in which the present coil assembly does not require the protective housing members formerly required in previous units of this character. We have also eliminated the necessity of wedging the coil assembly to the core structure by providing the integral molded enclosure for the coil winding and in the provision of the clamping members for the opposite side of the coil assembly. The number of assembly parts formerly required to form a track receiver of this type has also been substantially reduced, over fifty assembly parts being formerly required while our novel receiver comprises only sixteen assembly parts.

The ease with which our receiver may be assembled and disassembled is apparent from the drawings herein and the foregoing description, only two bolts fastening the clamps to the core structure. The provision of the integral plug receptacle on the coil assembly eliminates the necessity of disconnecting the coil winding leads at the junction box aboard the railway vehicle and the consequent pulling of the cable leads out through a protective hose used with former units. The present coil assembly may be disconnected by simply unscrewing the nut of the plug connector and separating the plug from the plug receptacle.

Although we have herein shown and described only one form of an inductive receiver embodying our invention, it is understood that various changes and modifications may be made therein within the scope of the appended claims without departing from the spirit and scope of our invention.

Having thus described our invention, what we claim is:

1. A vehicle carried receiver comprising a magnetizable core, a coil embedded within a protective water and oil proof enclosure of insulating material, said enclosure having an opening which receives said core with some clearance, and clamping means for securing said coil on said core comprising two nonmagnetic clamp members secured to said core and engaging opposite sides of said enclosure in a manner to maintain said clearance between said core and all points of said enclosure.

2. A vehicle carried receiver comprising a magnetizable core, a coil embedded within an enclosure of insulating material, said enclosure having an opening which receives said core with some clearance, extending ribs integral with said enclosure, and clamping means for securing said coil on said core, comprising two nonmagnetic clamp members secured to said core having recesses for receiving the extending ribs of said enclosure, said clamp members engaging opposite sides of said enclosure in a manner to maintain said clearance between said core and all points of said enclosure.

3. A vehicle carried receiver comprising a magnetizable core, a coil embedded within an enclosure of insulating material, said enclosure having an opening which receives said core with some clearance, extending ribs integral with said enclosure, and clamping means for securing said coil on said core, comprising two nonmagnetic clamp members secured to said core having recesses for receiving the extending ribs of said enclosure and flanges for holding said enclosure in a manner to maintain said clearance between said core and all points of said enclosure.

4. A vehicle carried receiver comprising a magnetizable core having a square cross section, a coil embedded within an enclosure of insulating material, said enclosure having a square opening which receives said core with some clearance, extending ribs integral with said enclosure, and clamping means for securing said coil on said core, comprising two nonmagnetic clamp members secured to said core having recesses for receiving the extending ribs of said enclosure and flanges for holding said enclosure in a manner to maintain said clearance between said core and all points of said enclosure.

5. A vehicle carried receiver comprising a coil embedded within an enclosure of insulating material, said enclosure having a square opening therein, a magnetizable core having a square cross section and adapted to be received within the enclosure opening with some clearance, an extending rib on two opposite sides of said enclosure, and two nonmagnetic clamp members for said opposite sides of said enclosure fixed to said core for securing said coil on said core, each clamp member having a recess to receive a rib on said enclosure and flanges to hold said enclosure in a manner to maintain said clearance between said core and all points of said enclosure.

6. A vehicle carried receiver comprising a coil embedded within an enclosure of insulating material, said enclosure having a square opening therein, a magnetizable core having a square cross section and adapted to be received within the enclosure opening with some clearance, an extending rib on two opposite sides of said enclosure, a plug receptacle integral with one of said extending ribs, the ends of said coil being connected to said plug receptacle; and two nonmagnetic clamp members for said opposite sides of said enclosure fixed to said core for securing said coil on said core, each clamp member having a recess for receiving a rib on said enclosure and flanges for holding said enclosure in a manner to maintain said clearance between said core and all points of said enclosure, one of said clamp members having an annular receptacle for receiving the plug receptacle on said enclosure.

LESLIE R. ALLISON.
HAROLD V. RUDOLPH.

REFERENCES CITED

The following references are of record in the file of this patent:

UNITED STATES PATENTS

| Number | Name | Date |
|---|---|---|
| 1,545,429 | Hunt | July 7, 1925 |
| 2,472,150 | Epstein | June 7, 1949 |